(No Model.)
E. C. McFADDEN.
TANDEM ATTACHMENT FOR BICYCLES.
No. 599,859. Patented Mar. 1, 1898.
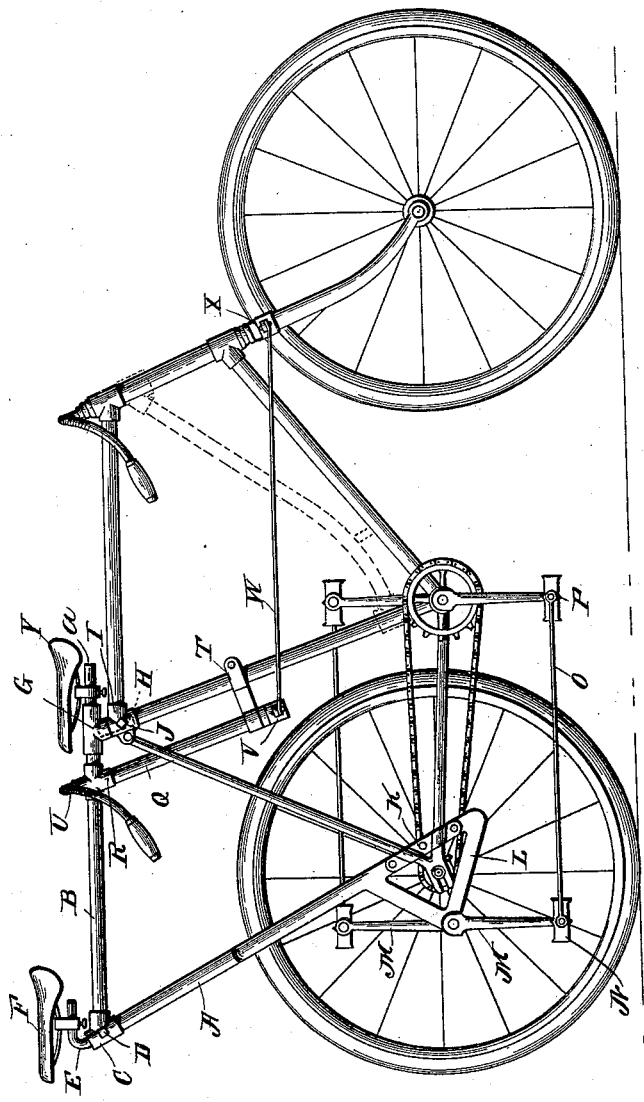
Witnesses
E. C. Wurdeman
J. J. Williamson
Inventor
Emerson C. McFadden
by Geo. H. Holgate
Attorney

UNITED STATES PATENT OFFICE.

EMERSON C. McFADDEN, OF SHORT HILLS, NEW JERSEY.

TANDEM ATTACHMENT FOR BICYCLES.

SPECIFICATION forming part of Letters Patent No. 599,859, dated March 1, 1898.

Application filed January 26, 1897. Serial No. 620,764. (No model.)

*To all whom it may concern:*

Be it known that I, EMERSON C. McFADDEN, a citizen of the United States, residing at Short Hills, in the county of Essex and State of New Jersey, have invented a certain new and useful Improvement in Tandem Attachments for Bicycles, of which the following is a specification.

My invention relates to a new and useful improvement in tandem attachments for bicycles, and has for its object to provide a simple, cheap, and effective device which may be quickly attached to an ordinary bicycle and render the same capable of use by two persons after the manner of an ordinary tandem, and yet when not desired for use it may be removed from the bicycle, leaving the latter in its usual condition, thus enabling a person owning a bicycle and my improved attachment to quickly convert said machine into either a two-seated or single-seated machine.

With these ends in view this invention consists in the details of construction and combination of elements hereinafter set forth and then specifically designated by the claims.

In order that those skilled in the art to which this invention appertains may understand how to make and use the same, its construction and operation will now be described in detail, referring to the accompanying drawing, forming a part of this specification, in which a bicycle is shown in elevation having my improvement attached thereto.

In carrying out this invention as here embodied I provide a frame which consists of the brace A and a horizontal bar B, the ends of which are united by the lug C, and this lug serves as the saddle-post clamp by having a bolt D threaded therein adapted to bear against the saddle-post E, upon which latter is supported the saddle F.

The bar B is provided with a T-head G, from which projects downward a shank H, (here shown in dotted lines,) and this shank passes within the saddle-clamp I and is there held by the set-bolt J. The lower portion of the brace A is bifurcated and passes to either side of the rear wheel of the bicycle and is secured to the backstays and rear braces of said bicycle by the clamps K, (but one of which is shown.) The lower end of each of the members of the bifurcated brace is provided with a triangular extension L, which latter projects rearward and has journaled in the vertex thereof the crank M, which latter is provided with a pedal N, there being one of these cranks on each side of the machine, and said cranks are connected by the rods O to the cranks P of the bicycle, from which it is obvious that both the primary and the auxiliary cranks will move in unison, so that both riders will have power to propel the machine.

The head Q extends downward from the lug R and is secured at its lower end to the seat-post tube of the bicycle by the clip T. Through this post passes a handle-bar spindle, the upper end of which has the handle-bar U secured thereto and the lower end a lever V, which is connected by the rod W to a lever X, secured to the crown of the front fork of the bicycle. This arrangement permits both riders to have control over the steering of the wheel in that any movement of the handle-bars U will effect a similar movement of the main handle-bars of the bicycle through the rod W, thus turning the front wheel of the machine in any desired direction.

The main saddle Y is mounted upon a horizontal post $a$, which projects from the T-head, thereby providing for the variance of the position of this saddle to accommodate it for various-height riders.

I have shown in dotted lines a drop-bar, which will indicate how my improvement may be used in connection with a lady's bicycle, from which it is obvious that my attachment may be applied to either a man's or lady's wheel.

While I have here shown the handle-bars U made movable and connected to the fork of the front wheel, this is not essential, and said bars may be made stationary, in which case the head Q, clip T, and connecting-rod W would be omitted, thus not only simplifying the construction of the attachment, but also increasing the facility with which said attachment might be secured to or removed from the bicycle and obviating the necessity of making any addition or alteration in the bicycle for the purpose of attaching my improvement thereto.

One of the advantages of my invention is that but little weight is added to the framework of the machine, while it is made capable of supporting two persons, thus rendering the front more effective than an ordinary tandem, and at much less expense.

Having thus fully described my invention, what I claim as new and useful is—

1. In combination with a safety-bicycle, a T-head secured in the saddle-post tube, a horizontal bar extending rearwardly through the T-head, an extension of the horizontal bar in front of the T-head, a steering-head extending downwardly from the horizontal bar between the rear forks, a handle-bar secured in the head, and connection between the handle-bar and the steering mechanism of the bicycle, a bifurcated tube running downward from the rear end of the horizontal bar, and connected at each side to the stay-tubes of the frame, substantially as described.

2. A tandem attachment for bicycles consisting of a horizontal bar connected to the saddle-post tube of a safety-bicycle, a bifurcated tube extending downward from the rear end of the horizontal bar and clamped on each side to the rear stay-bars, braces extending rearwardly from near the bottom of each member of the bifurcated bar, cranks journaled on each side at the point of meeting of the braces, and connections between the cranks and the driving mechanism of the bicycle, substantially as described.

In testimony whereof I have hereunto affixed my signature in the presence of two subscribing witnesses.

EMERSON C. McFADDEN.

Witnesses:
S. S. WILLIAMSON,
R. M. PIERCE.